(12) United States Patent
Ling et al.

(10) Patent No.: US 10,900,542 B2
(45) Date of Patent: Jan. 26, 2021

(54) AUTOMATIC TRANSMISSION HAVING THREE PLANETARY ROWS AND VEHICLE

(71) Applicant: GUANGZHOU AUTOMOBILE GROUP CO., LTD., Guangdong (CN)

(72) Inventors: Xiaoming Ling, Guangdong (CN); Fenfen Ma, Guangdong (CN); Changning Tai, Guangdong (CN); You Zhou, Guangdong (CN); Tianli Xie, Guangdong (CN); Ge Lei, Guangdong (CN); Xuewu Liu, Guangdong (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 110 days.

(21) Appl. No.: 16/337,922

(22) PCT Filed: Oct. 22, 2018

(86) PCT No.: PCT/CN2018/111298
§ 371 (c)(1),
(2) Date: Mar. 29, 2019

(87) PCT Pub. No.: WO2019/128413
PCT Pub. Date: Jul. 4, 2019

(65) Prior Publication Data
US 2020/0370624 A1    Nov. 26, 2020

(30) Foreign Application Priority Data
Dec. 29, 2017 (CN) .......................... 2017 1 1499208

(51) Int. Cl.
*F16H 3/66* (2006.01)
*F16H 59/36* (2006.01)

(52) U.S. Cl.
CPC ............... *F16H 3/66* (2013.01); *F16H 59/36* (2013.01); *F16H 2200/0052* (2013.01);
(Continued)

(58) Field of Classification Search
CPC .... F16H 3/66; F16H 59/36; F16H 2200/2046; F16H 2200/0056; F16H 2200/201;
(Continued)

(56) References Cited

U.S. PATENT DOCUMENTS 6,752,738 B1 * 6/2004 Martin .................... F16H 3/663
475/276
6,767,304 B1 * 7/2004 Botosan .................. F16H 3/663
475/132
(Continued)

*Primary Examiner* — David J Hlavka

(57) ABSTRACT

The input element of the automatic transmission is fixedly connected to the second sun gear, the output element is fixedly connected to the third planetary carrier, the second planetary carrier is fixedly connected to the third gear ring, the first gear ring is fixedly connected to the third planetary carrier, and the third sun gear is stationary. The first brake is engaged to brake the first rear sun gear, the second brake is engaged to brake the first front sun gear, and the third brake is engaged to simultaneously brake the first planetary carrier and the second gear ring; the first rear sun gear is connected to the input element via the first clutch, the first planetary carrier is connected to the second sun gear via the second clutch, and the first planetary carrier is connected to the second gear ring via the third clutch.

9 Claims, 5 Drawing Sheets

(52) U.S. Cl.
CPC ............... *F16H 2200/0056* (2013.01); *F16H 2200/201* (2013.01); *F16H 2200/2012* (2013.01); *F16H 2200/2046* (2013.01); *F16H 2200/2097* (2013.01)

(58) Field of Classification Search
CPC ....... F16H 220/2012; F16H 2200/2097; F16H 2200/0052
See application file for complete search history.

(56) References Cited

U.S. PATENT DOCUMENTS

| | | | | |
|---|---|---|---|---|
| 2004/0014549 A1* | 1/2004 | Choi | ...................... | F16H 3/66 475/269 |
| 2004/0014553 A1* | 1/2004 | Ishimaru | ................ | F16H 3/663 475/275 |
| 2004/0014554 A1* | 1/2004 | Ishimaru | ................ | F16H 3/663 475/296 |
| 2004/0248694 A1* | 12/2004 | Ishimaru | ................ | F16H 3/663 475/275 |
| 2015/0267789 A1* | 9/2015 | Kurematsu | .............. | F16H 7/08 474/110 |

* cited by examiner

AUTOMATIC TRANSMISSION HAVING THREE PLANETARY ROWS AND VEHICLE

FIELD OF THE INVENTION

The present invention relates to automotive field and, more particularly to an automatic transmission having three planetary rows and a vehicle with the same.

BACKGROUND OF THE INVENTION

A mechanism for realizing gear shifting of an electronically controlled hydraulic transmission drive system generally includes a plurality of planetary rows, and the engine power is transmitted to the planetary gear shifting mechanism through the hydraulic torque converter for output after gear shifting. The volume, weight, efficiency and load carrying capacity of the automatic transmission are directly related to the layout of the planetary row structure. The more gears the automatic transmission gear train has, the lower the fuel consumption of the car spends, and the economy is better. However, as the number of gears increases, the number of planetary rows and the number of clutches and brakes are also increasing.

At present, eight-speed automatic transmission used in the passenger car market mainly includes: (1) 8-speed ZF 8HP transmission of ZF Friedrichshafen AG; (2) eight-speed TR-80SD transmission of Aisin; (3) eight-speed 8L90 transmission of General Motors Corporation (GM) (4) eight-speed A8L/TR1 transmission of Hyundai Powtai; (5) SR8AT-300 transmission of Shengrui Transmission Corporation Limited (hereinafter referred to as Shengrui).

However, the SR8AT-300 transmission of Shengrui includes four pairs of fixed-shaft constant meshing gears on the intermediate shaft, making the elements of the transmission increase, which is not conducive to the compactness of the structure. Both of the eight-speed TR-80SD transmission of Aisin and the eight-speed A8L/TR1 transmission of Hyundai Powtai adopts the Lavina structure and double planetary gearsets, making the structure of the transmission too complicated, which is not conducive to the lightweight design of the transmission.

SUMMARY OF THE INVENTION

An aspect of the present disclosure is to provide an automatic transmission having three planetary rows which applies three single planetary gearsets, three clutches and three brakes to achieve eight forward gears and one reverse gear, thereby improving the compactness of the transmission, simplifying the structure of the transmission, and benefiting the lightweight design of the transmission.

To achieve the above objective, the present disclosure provides an automatic transmission having three planetary rows, comprising an input element, an output element, a first planetary row, a second planetary row and a third planetary row, a first clutch, a second clutch and a third clutch, and a first brake, a second brake and a third brake, the first planetary row, the second planetary row, and the third planetary row orderly being arranged along a same rotation axis. The first planetary row comprises a first front sun gear, a first rear sun gear, a first gear ring, a first planetary carrier and a first planetary gearset; the second planetary row comprises a second sun gear, a second gear ring, a second planetary carrier and a second planetary gearset; the third planetary row comprises a third sun gear, a third gear ring, a third planetary carrier and a third planetary gearset. The input element is fixedly connected to the second sun gear, the output element is fixedly connected to the third planetary carrier, the second planetary carrier is fixedly connected to the third gear ring, the first gear ring is fixedly connected to the third planetary carrier, and the third sun gear is stationary. The first brake is selectively engaged to brake the first rear sun gear, the second brake is selectively engaged to brake the first front sun gear, and the third brake is selectively engaged to simultaneously brake the first planetary carrier and the second gear ring. The first rear sun gear is connected to the input element via the first clutch, the first planetary carrier is connected to the second sun gear via the second clutch, and the first planetary carrier is connected to the second gear ring via the third clutch.

As a preferable embodiment, in the first planetary row, the first planetary gearset comprises a first front planetary gearset and a rear planetary gearset coaxially and fixedly connected to each other, the first front sun gear is engaged with the first front planetary gearset, the first rear sun gear is engaged with the first rear planetary gearset which is engaged with the first gear ring, and the first planetary gearset is mounted on a shaft of the first planetary carrier by a bearing.

As a preferable embodiment, in the second planetary row, the second sun gear is engaged with the second planetary gearset which is engaged with the second gear ring, and the second planetary gearset is mounted on a shaft of the second planetary carrier by a first bearing; in the third planetary row, the third sun gear is engaged with the third planetary gearset which is engaged with the third gear ring, and the third planetary gearset is mounted on a shaft of the third planetary carrier by a second bearing.

As a preferable embodiment, one end of the first brake is connected to a box body of the transmission, another end of the first brake is connected to the first rear sun gear; one end of the second brake is connected to the box body of the transmission, another end of the second brake is connected to the first front sun gear; and one end of the third brake is connected to the box body of the transmission, another end of the third brake is connected to the first planetary carrier and the second gear ring.

As a preferable embodiment, the third sun gear is fixedly connected to the box body of the transmission.

As a preferable embodiment, the first, the second and the third clutches are multi-plate wet clutches or canine clutches.

As a preferable embodiment, the input element and the second sun gear are connected by welding or by splines, or in an integrated structure; the output element and the third planetary carrier are connected by welding or by splines, or in an integrated structure; the second \ planetary carrier and the third gear ring are connected by welding or by splines, or in an integrated structure; the first gear ring and the third planetary carrier are connected by welding or by splines, or in an integrated structure.

As a preferable embodiment, a first forward speed ratio is established between the input element and the output element, once the third clutch and the third brake are engaged simultaneously; a second forward speed ratio is established between the input element and the output element, once the third clutch and the second brake are engaged simultaneously; a third forward speed ratio is established between the input element and the output element, once the third clutch and the first brake are engaged simultaneously; a fourth forward speed ratio is established between the input element and the output element, once the first clutch and the third clutch are engaged simultaneously; a fifth forward speed ratio is established between the input element and the output element, once the second clutch and the third clutch are engaged simultaneously; a sixth forward speed ratio is established between the input element and the output element, once the first clutch and the second clutch are engaged simultaneously; a seventh forward speed ratio is established between the input element and the output element, once the second clutch and the first brake are engaged simultaneously; an eighth forward speed ratio is established between the input element and the output element, once the second clutch and the second brake are engaged simultaneously; and a reverse speed ratio is established between the input element and the output element, when the first clutch and the third brake are engaged simultaneously.

The present disclosure further provides a vehicle comprising the automatic transmission having three planetary rows mentioned above.

The automatic transmission having three planetary rows according to the present disclosure adopts three clutches and three brakes as operating elements connecting with three planetary rows, thereby achieving multiple speed ratio transformations (eight forward speed ratios and a reverse speed ratio) by selectively engaging two of operating elements. Further, single planetary gearset is used in the three planetary rows, which improves the compactness of the transmission, simplifies the structure of the transmission, thereby facilitating the lightweight design of the transmission.

In addition, the use of more clutches can facilitate the nesting design of the clutches, making the structure of the transmission more compact, and can help to cut the connection relationship between the planetary rows under a specific gear, so that the redundant planetary rows are idle without carrying torque or participating in rotation, so as to reduce the towing torque of the planetary row and improve the transmission efficiency of the transmission.

Figure 1:
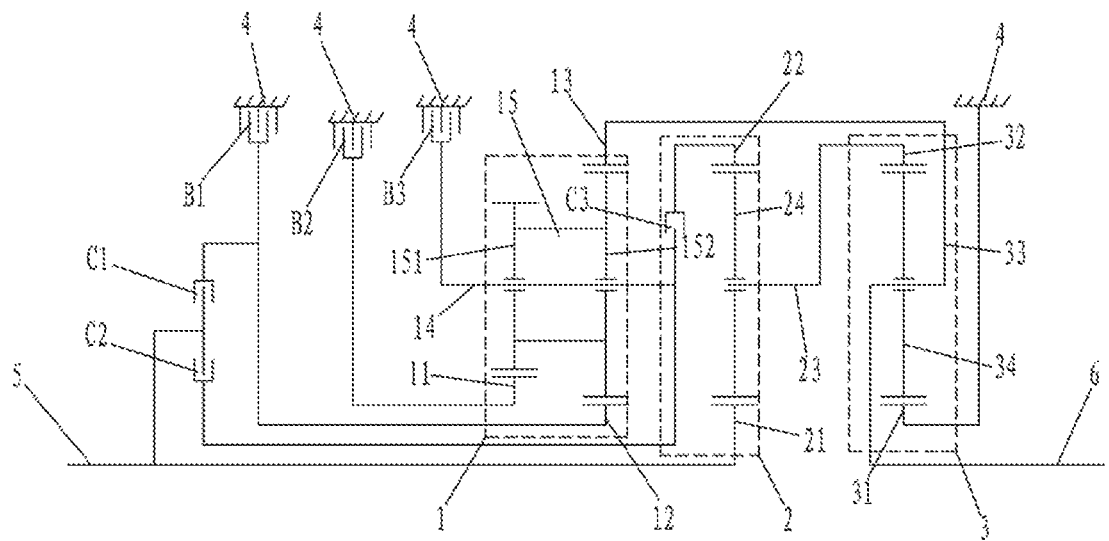
FIG. 1 is a schematic diagram of an automatic transmission having three planetary rows showing the connections of elements thereof, according to one embodiment of the present disclosure.

REFERENCE NUMERALS 1 first planetary row; 11 first front sun gear; 12 first rear sun gear; 13 first gear ring; 14 first planetary carrier; 15 first planetary gearset; 151 first front planetary gearset; 152 first rear planetary gearset; 2 second planetary row; 21 second sun gear; 22 second gear ring; 23 second planetary carrier; 24 second planetary gearset; 3 third planetary row; 31 third sun gear; 32 third gear ring; 33 third planetary carrier; 34 third planetary gearset; 4 box body; 5 input element; 6 output element; C1 first clutch; C2 second clutch; C3 third clutch; B1 first brake; B2 second brake; B3 third brake.

DETAILED DESCRIPTION OF ILLUSTRATED EMBODIMENTS

The specific technical solutions of the present disclosure are further described in detail below with reference to the drawings and embodiments. The following examples are intended to illustrate the invention but are not intended to limit the scope of the invention.

Referring to FIG. 1, an automatic transmission having three planetary rows according to a first embodiment of the present disclosure includes an input element 5 (input shaft) and output element 6 (output shaft), a first planetary row 1, a second planetary row 2 and a third planetary row 3 orderly arranged along a same rotation axis, a first clutch C1, a second clutch C2 and a third clutch C3, and a first brake B1, a second brake B2 and a third brake B3.

Specifically, the first planetary row 1 includes a first front sun gear 11, a first rear sun gear 12, a first gear ring 13, a first planetary carrier 14 and a first planetary gearset 15 including a first front planetary gearset 151 and a first rear planetary gearset 152. The first front sun gear 11 is engaged with the first front planetary gearset 151, the first rear sun gear 12 is engaged with the first rear planetary gearset 152 which is engaged with the first gear ring 13, and the first planetary gearset 15 is mounted on a shaft of the first planetary carrier 14 by means of a bearing.

The second planetary row 2 includes a second sun gear 21, a second gear ring 22, a second planetary carrier 23 and a second planetary gearset 24. Specifically, the second planetary gearset 24 meshes with the second sun gear 21 and the second gear ring 22 respectively, and the second planetary gearset 24 is mounted on a shaft of the second planetary carrier 23 by means of a bearing.

The third planetary row 3 includes a third sun gear 31, a third gear ring 32, a third planetary carrier 33 and a third planetary gearset 34. Specifically, the third planetary gearset 34 meshes with the third sun gear 31 and the third gear ring 32 respectively, and the third planetary gearset 34 is mounted on a shaft of the third planetary carrier 33 by means of a bearing.

Referring to FIG. 1 again, the input element 5 is fixedly connected to the second sun gear 21 by welding or by splines, or the input element 5 is connected with the second sun gear 21 in an integrated structure. The output element 6 is fixedly connected to the third planetary carrier 33 by welding or by splines, or they are connected in an integrated structure. The second planetary carrier 23 is fixedly connected to the third gear ring 32 by welding or by splines, or they are connected in an integrated structure; and the first gear ring 13 is fixedly connected to the third planetary carrier 33 by welding or by splines, or they are connected in an integrated structure. The third sun gear 31 is stationary, that is the third sun gear 31 is in a state of constant braking, thus for reducing the amount of the brakes, the third sun gear 31 is fixedly connected to the box boy 4.

One end of the first brake B1 is connected to the box body 4 of the transmission, another end of the first brake B1 is connected to the first rear sun gear 12, so that the first sun gear 12 can be braked when the first brake B1 is selectively engaged. One end of the second brake B2 is connected to the box body 4, another end of the second brake B2 is connected to the first front sun gear 11, so that the first front sun gear 12 can be braked when the second brake B2 is selectively engaged. Similarly, one end of the third brake B3 is connected to the box body 4, another end of the third brake B3 is connected to the first planetary carrier 14 and the second gear ring 22, so that the first planetary carrier 14 and the second gear ring 22 can be simultaneously braked when the third brake B3 is selectively engaged.

The first rear sun gear 12 is connected with the input element 5 by means of the first clutch C1, so that the power from the input element 5 can be transferred to the first rear sun gear 12 when the first clutch C1 is selectively engaged. The first planetary carrier 14 is connected to the second sun gear 21 by means of the second clutch C2, and the first planetary carrier 14 is connected to the second gear ring 22 by means of the third clutch C3.

In additional, the three clutches C1, C2, and C3 can be multi-plate wet clutches or canine clutches, which are beneficial to the nesting of the clutches.

In the following descriptions and examples, multiple speed ratio transformations are established between the input element 5 and the output element 6 by selective engagement of two of the six operating elements.

In Table 1, which is a logic table of speed ratio transformations of the automatic transmission having three planetary rows according to the present embodiment, a symbol • denotes element engagement, eight forward speed ratios and one reverse speed ratio are established between the input element 5 and the output element 6. For ease of description, the eight forward speed ratios are sequentially denoted as $1^{st}$ gear and $8^{th}$ gear, and the reverse speed ratio is denoted as R gear. In Table 1, K0 and K1 are characteristic parameters of the first planetary row 1, wherein the value of K0 is equal to the gear ratio of the first ring gear 13 and the first front sun gear 11, and the value of K1 is equal to the gear ratio of the first ring gear 13 and the first rear sun gear 12; K2 is the characteristic parameter of the second planetary row 2, the value thereof is equal to the gear ratio of the second ring gear 22 and the second sun gear 21; and K3 is the characteristic parameter of the third planetary row 3, the value thereof is equal to the gear ratio of the third ring gear 32 to the third sun gear 31.

Figure 2:
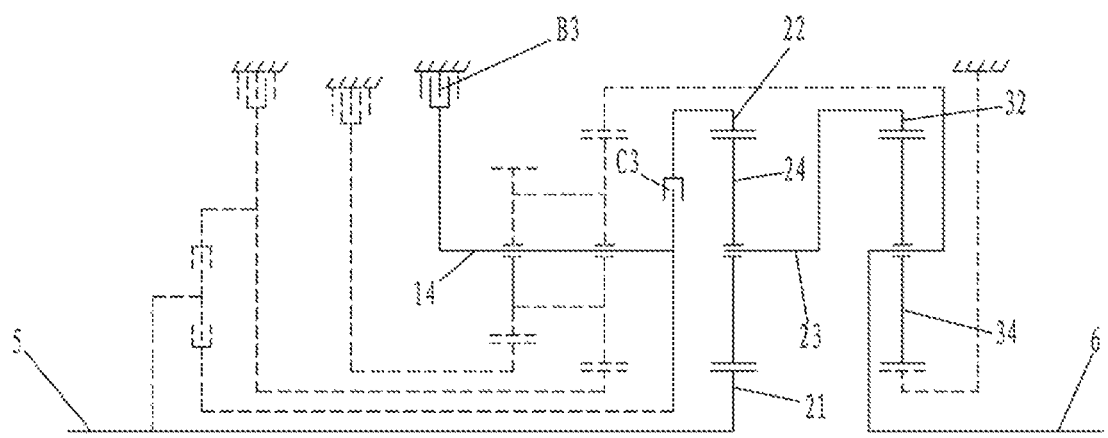
FIG. 2 a schematic diagram showing a power transfer route of the automatic transmission having three planetary rows of FIG. 1 while achieving a first forward speed ratio.

Combining Table 1 with FIG. 2, when the third clutch C3 and the third brake B3 are simultaneously engaged, a first forward speed ratio ($1^{st}$ gear) is established between the input element 5 and the output element 6. In this 1st gear, the third clutch C3 is engaged to connect the first planetary carrier 14 with the second gear ring 22, and meanwhile the third brake B3 is engaged to brake the first planetary carrier 14 and the second gear ring 22 simultaneously, while the third sun gear 31 is under a constant braking status, therefore, the power transferring route of the $1^{st}$ gear is: the input element 5→ the second sun gear 21→ the second planetary gearset 24→ the second planetary carrier 23→ the third gear ring 32→ the third planetary gearset 34→ the third planetary carrier 33→ the output element 6, as illustrated in FIG. 2. By this token, the transmission speed ratio of the $1^{st}$ gear is: $i1=[(1+K2)*(1+K3)]/K3$.

Figure 3:
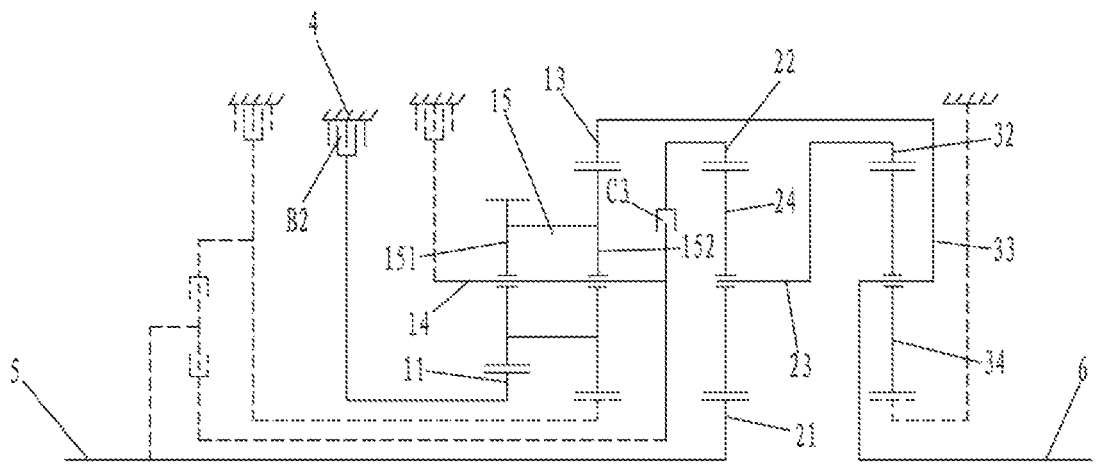
FIG. 3 a schematic diagram showing a power transfer route of the automatic transmission having three planetary rows of FIG. 1 while achieving a second forward speed ratio.

Combining Table 1 with FIG. 3, when the third clutch C3 and the second brake B2 are simultaneously engaged, a second forward speed ratio ($2^{nd}$ gear) is generated between the input element 5 and the output element 6. In the $2^{nd}$ gear, the third clutch C3 is engaged to connect the first planetary carrier 14 with the second gear ring 22, and the second brake B2 is engaged to brake the first sun gear 11, while the third sun gear 31 is under a constant braking status, therefore, two power transferring routes of the $2^{nd}$ gear are established, as illustrated in FIG. 3, one is: the input element 5→ the second sun gear 21→ the second planetary gearset 24→ the second planetary carrier 23→ the third gear ring 32→ the third planetary gearset 34→ the third planetary carrier 33 → the output element 6; the other is: the input element 5 → the second sun gear 21→ the second planetary gearset 24 → the second gear ring 22→ the third clutch C3→ 4 the first planetary carrier 14→ the first planetary gearset 15 → the first gear ring 13→ the third planetary carrier 33 → the output element 6. By this token, the transmission speed ratio of the $2^{nd}$ gear is: $i2=[(1+K0)*(1+K2)+K3*(1+K0+K2)]/[K3*(1+K0)]$.

Figure 4:
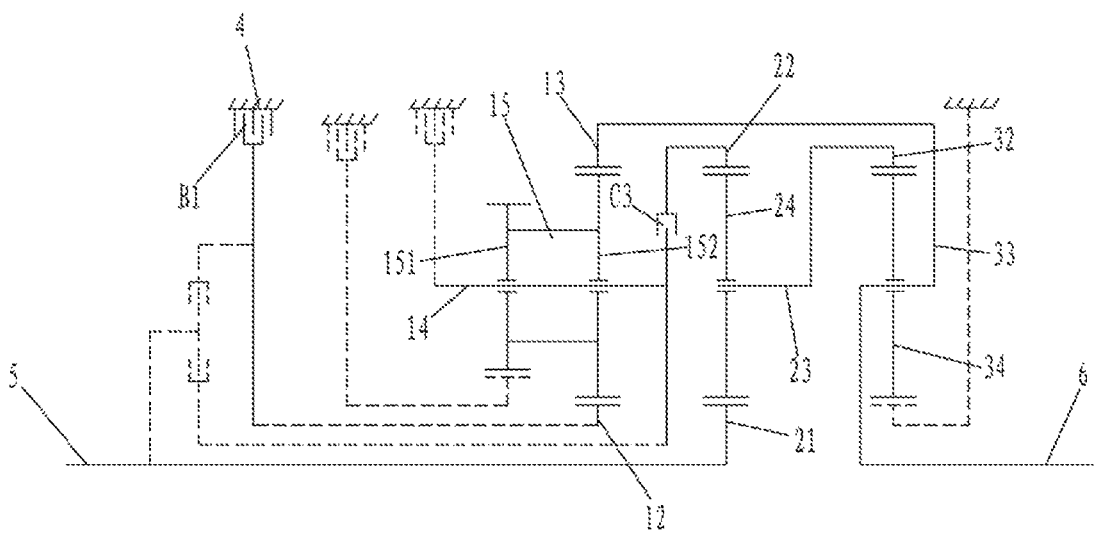
FIG. 4 a schematic diagram showing a power transfer route of the automatic transmission having three planetary rows of FIG. 1 while achieving a third forward speed ratio.

Combining Table 1 with FIG. 4, when the third clutch C3 and the first brake B1 are simultaneously engaged, a third forward speed ratio ($3^{rd}$ gear) is established between the input element 5 and the output element 6. In the $3^{rd}$ gear, the third clutch C3 is engaged to connect the first planetary carrier 14 with the second gear ring 22, and the first brake B1 is engaged to brake the first rear sun gear 12, while the third sun gear 31 is under a constant braking status, therefore, two power transferring routes under the $3^{rd}$ gear are established, as illustrated in FIG. 4, one is: the input element 5→ the second sun gear 21→ the second planetary gearset 24→ the second planetary carrier 23→ the third gear ring 32→ the third planetary gearset 34→ the third planetary carrier 33→ the output element 6; the other is: the input element 5→ the second sun gear 21→ the second planetary gearset 24→ the second gear ring 22→ the third clutch C3 → the first planetary carrier 14→ the first planetary gearset 15→ the first gear ring 13→ the third planetary carrier 33 → the output element 6. By this token, the transmission speed ratio of the $3^{rd}$ gear is: $i3=[(1+K1)*(1+K2)+K3*(1+K1+K2)]/[K3*(1+K1)]$.

Figure 5:
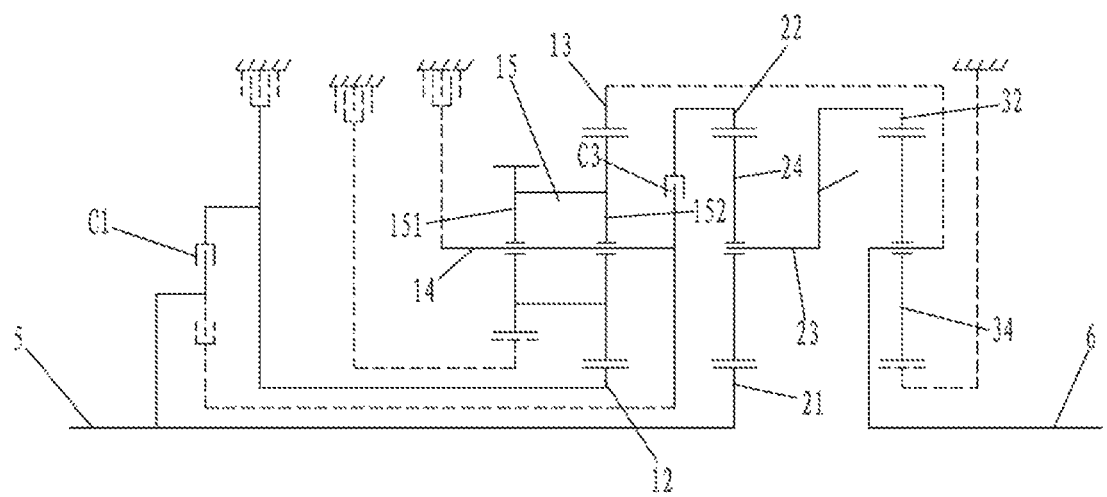
FIG. 5 a schematic diagram showing a power transfer route of the automatic transmission having three planetary rows of FIG. 1 while achieving a fourth forward speed ratio.

Combining Table 1 with FIG. 5, when the first clutch C1 and the third clutch C3 are simultaneously engaged, a fourth forward speed ratio ($4^{th}$ gear) is established between the input element 5 and the output element 6. In the $4^{th}$ gear, the first clutch C1 is engaged to connect the first rear sun gear 12 with the input element 5, the third clutch C3 is engaged to connect the first planetary carrier 14 with the second gear ring 22, while the third sun gear 31 is under a constant braking status, therefore, three power transferring routes under the $4^{th}$ gear are established, as illustrated in FIG. 5, one is: the input element 5→ the second sun gear 21→ the second planetary gearset 24→ the second planetary carrier 23→ the third gear ring 32→ the third planetary gearset 34 → the third planetary carrier 33→ the output element 6; the second one is: the input element 54 the second sun gear 21 → the second planetary gearset 24→ the second gear ring 22→ the third clutch C3→ the first planetary carrier 14 → the first planetary gearset 15→ the first gear ring 13 → the third planetary carrier 33→ the output element 6; and the third one is: the input element 5→ the first clutch C1 → the first rear sun gear 12→ the first planetary gearset 15 → the first gear ring 13→ the third planetary carrier 33 → the output element 6.

By this token, the transmission speed ratio of the 4$^{th}$ gear is: $i4=[(1+K1)*(1+K2)+K3*(1+K1+K2)]/[K3*(1+K1+K2)]$.

Figure 6:
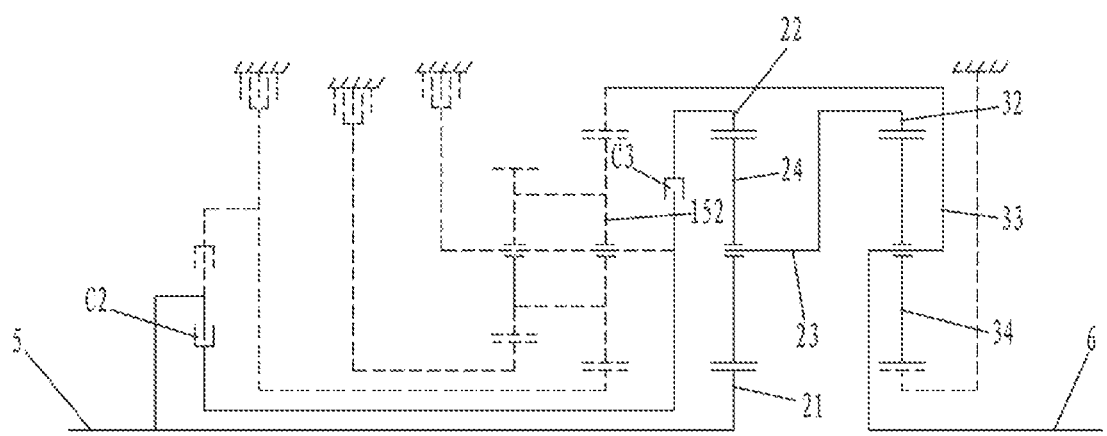
FIG. 6 a schematic diagram showing a power transfer route of the automatic transmission having three planetary rows of FIG. 1 while achieving a fifth forward speed ratio.

Combining Table 1 with FIG. 6, when the second clutch C2 and the third clutch C3 are simultaneously engaged, a fifth forward speed ratio (5$^{th}$ gear) is established between the input element 5 and the output element 6. In this 5$^{th}$ gear, the second clutch C2 and the third clutch C3 are simultaneously engaged to make the second planetary row 2 rotate overall, while the third sun gear 31 is under a constant braking status, therefore, the power transferring route under the 5$^{th}$ gear is: the input element 5→ the second planetary row 2 (rotated overall)→ the third gear ring 32→ the third planetary gearset 34→ the third planetary carrier 33→ the output element 6, as illustrated in FIG. 6. By this token, the transmission speed ratio of the 5$^{th}$ gear is: $i5=(1+K3)/K3$.

Figure 7:
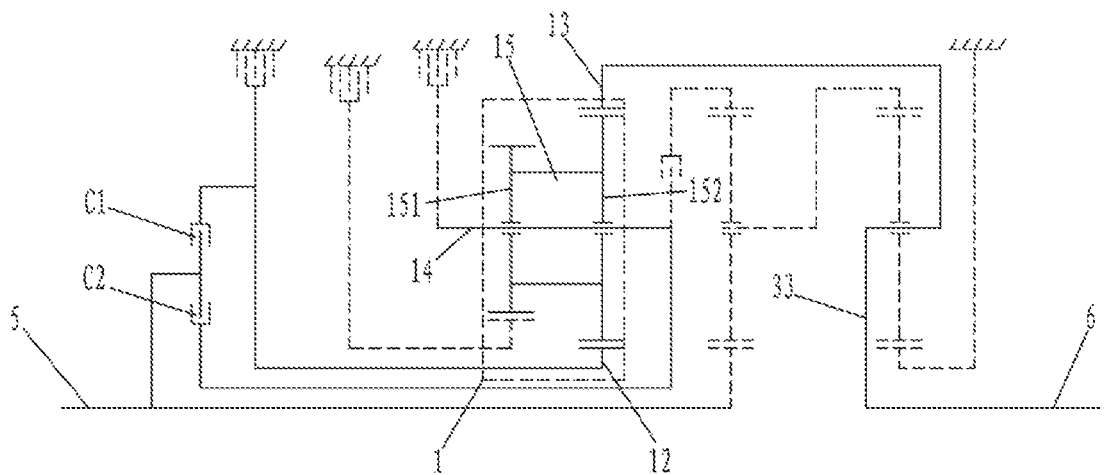
FIG. 7 a schematic diagram showing a power transfer route of the automatic transmission having three planetary rows of FIG. 1 while achieving a sixth forward speed ratio.

Combining Table 1 with FIG. 7, when the first clutch C1 and the second clutch C2 are simultaneously engaged, a sixth forward speed ratio (6$^{th}$ gear) is established between the input element 5 and the output element 6. In this 6$^{th}$ gear, the first clutch C and the second clutch C2 are simultaneously engaged to make the first planetary row 1 rotate overall, while the third sun gear 31 is under a constant braking status, therefore, the power transferring route under the 6$^{th}$ gear is: the input element 5→ the first planetary row 1 (rotated overall)→ the first gear ring 13→ the third planetary carrier 33→ the output element 6, as illustrated in FIG. 7. By this token, the transmission speed ratio of the 6$^{th}$ gear is: $i6=1$.

Figure 8:
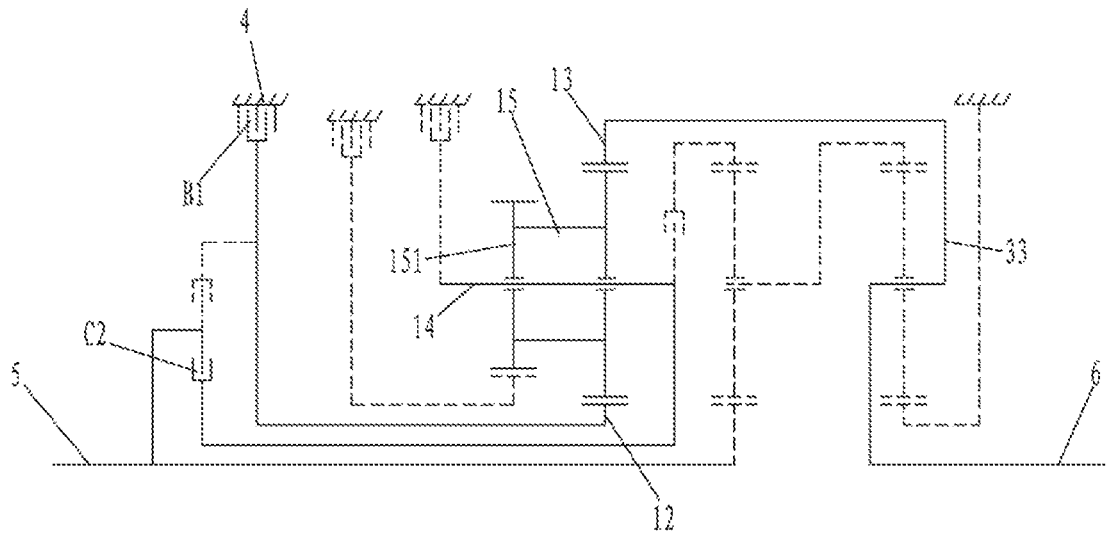
FIG. 8 a schematic diagram showing a power transfer route of the automatic transmission having three planetary rows of FIG. 1 while achieving a seventh forward speed ratio.

Combining Table 1 with FIG. 8, when the second clutch C2 and the first brake B1 are simultaneously engaged, a seventh forward speed ratio (7$^{th}$ gear) is established between the input element 5 and the output element 6. In this 7$^{th}$ gear, the first brake B1 is engaged to brake the first rear sun gear 12, and the second clutch C2 is engaged to connect the first planetary carrier 14 with the input element 5, while the third sun gear 31 is under a constant braking status, therefore, the power transferring route under the 7$^{th}$ gear is: the input element 5→ the second clutch C2→ the first planetary carrier 14→ the first planetary gear set 15→ the first gear ring 13→ the third planetary carrier 33→ the output element 6, as illustrated in FIG. 8. By this token, the transmission speed ratio of the 7$^{th}$ gear is: $i7=K1/(1+K1)$.

Figure 9:
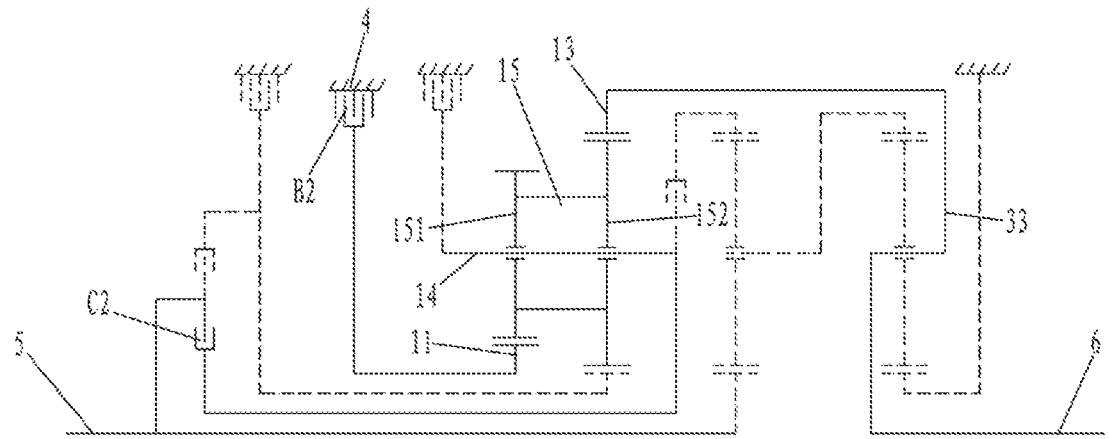
FIG. 9 a schematic diagram showing a power transfer route of the automatic transmission having three planetary rows of FIG. 1 while achieving an eighth forward speed ratio.

Combining Table 1 with FIG. 9, when the second clutch C2 and the second brake B2 are simultaneously engaged, an eighth forward speed ratio (8$^{th}$ gear) is established between the input element 5 and the output element 6. In this 8$^{th}$ gear, the second clutch C2 is engaged to connect the first planetary carrier 14 with the input element 5, and meanwhile the second brake B2 is engaged to brake the first front sun gear 11, while the third sun gear 31 is under a constant braking status, therefore, the power transferring route under the 8$^{th}$ gear is: the input element 5→ the second clutch C2→ the first planetary carrier 14→ the first planetary gear set 15 → the first gear ring 13→ the third planetary carrier 33 → the output element 6, as illustrated in FIG. 9. By this token, the transmission speed ratio of the 8$^{th}$ gear is: $i8=K0/(1+K0)$.

Figure 10:
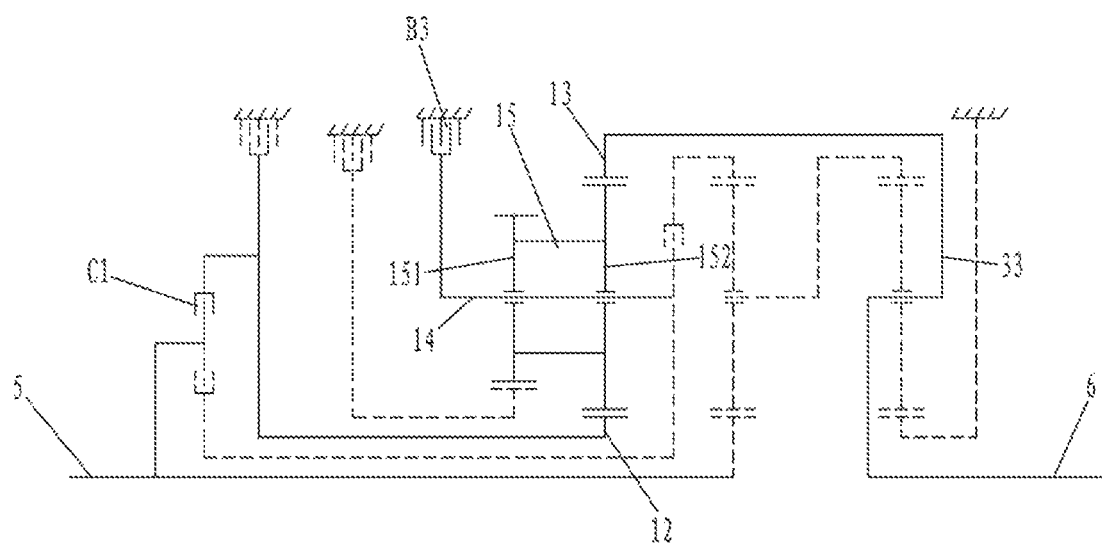
FIG. 10 a schematic diagram showing a power transfer route of the automatic transmission having three planetary rows of FIG. 1 while achieving a reverse speed ratio.

Combining Table 1 with FIG. 10, when the first clutch C1 and the third brake B3 are engaged, a reverse speed ratio (R gear) is established between the input element 5 and the output element 6. In the R gear, the first clutch C1 is engaged to connect the input element 5 with the first rear sun gear 12, and the third brake B3 is engaged to simultaneously brake first planetary carrier 14 and the second gear ring 22, while the third sun gear 31 is under a constant braking status, therefore, the power transferring route under the R gear is: the input element 5→ the first clutch C1→ the first rear sun gear 12→ the first planetary gear set 15→ the first gear ring 13→ the third planetary carrier 33→ the output element 6, as illustrated in FIG. 10. By this token, the speed ratio of the R gear is: $iR=-K1$.

TABLE 1

| Gear | C1 | C2 | C3 | B1 | B2 | B3 | Speed ratio |
|---|---|---|---|---|---|---|---|
| 1$^{st}$ |  |  | ● |  |  | ● | $[(1 + K2) * (1 + K3)]/K3$ |
| 2$^{nd}$ |  |  | ● |  | ● |  | $[(1 + K0) * (1 + K2) + K3 *$ $(1 + K0 + K2)]/[K3 * (1 + K0)]$ |
| 3$^{rd}$ |  |  | ● | ● |  |  | $[(1 + K1) * (1 + K2) + K3 *$ $(1 + K1 + K2)]/[K3 * (1 + K1)]$ |
| 4$^{th}$ | ● |  | ● |  |  |  | $[(1 + K1) * (1 + K2) + K3 *$ $(1 + K1 + K2)]/[K3 * (1 + K1 + K2)]$ |
| 5$^{th}$ |  | ● | ● |  |  |  | $(1 + K3)/K3$ |
| 6$^{th}$ | ● | ● |  |  |  |  | 1 |
| 7$^{th}$ |  | ● |  | ● |  |  | $K1/(1 + K1)$ |
| 8$^{th}$ |  | ● |  |  | ● |  | $K0/(1 + K0)$ |
| R | ● |  |  |  |  | ● | $-K1$ |

For solving the same technical, the present disclosure further provides a vehicle including the automatic transmission having three planetary rows mentioned above.

In conclusion, the automatic transmission having three planetary rows according to the present disclosure adopts three clutches and three brakes as operating elements connecting with three planetary rows, thereby achieving multiple speed ratio transformations (eight forward speed ratios and a reverse speed ratio) by selectively closing two of operating elements. Further, single planetary gearset is used in the three planetary rows, which improves the compact structure of the transmission, simplifies the structure of the transmission, thereby facilitating the lightweight design of the transmission.

In addition, the use of more clutches can facilitate the nesting design of the clutches, making the structure of the transmission more compact, and can help to cut the connection relationship between the planetary rows under a specific gear, so that the redundant planetary rows are idle without carrying torque or participating in rotation, so as to reduce the towing torque of the planetary row and improve the transmission efficiency of the transmission.

While the invention has been described in connection with what are presently considered to be the most practical and preferable embodiments, it is to be understood that the invention is not to be limited to the disengaged embodiments, but on the contrary, is intended to cover various modifications and equivalent arrangements included within the spirit and scope of the invention.

What is claimed is:

1. An automatic transmission having three planetary rows, comprising an input element, an output element, a first planetary row, a second planetary row, a third planetary row, a first clutch, a second clutch and a third clutch, and a first brake, a second brake and a third brake, the first planetary row, the second planetary row, and the third planetary row being orderly arranged along a same rotation axis;

wherein the first planetary row comprises a first front sun gear, a first rear sun gear, a first gear ring, a first planetary carrier and a first planetary gearset; the second planetary row comprises a second sun gear, a second gear ring, a second planetary carrier and a second planetary gearset; the third planetary row comprises a third sun gear, a third gear ring, a third planetary carrier and a third planetary gearset;

the input element is fixedly connected to the second sun gear, the output element is fixedly connected to the third planetary carrier, the second planetary carrier is fixedly connected to the third gear ring, the first gear ring is fixedly connected to the third planetary carrier, and the third sun gear is stationary;

the first brake is selectively engaged to brake the first rear sun gear, the second brake is selectively engaged to brake the first front sun gear, and the third brake is selectively engaged to brake the first planetary carrier, and when the third clutch is engaged, the third brake is selectively engaged to simultaneously brake the first planetary carrier and the second gear ring;

the first rear sun gear is connected to the input element via the first clutch, the first planetary carrier is connected to the second sun gear via the second clutch, and the first planetary carrier is connected to the second gear ring via the third clutch.

2. The automatic transmission having three planetary rows according to claim 1, wherein in the first planetary row, the first planetary gearset comprises a first front planetary gearset and a rear planetary gearset coaxially and fixedly connected to each other, the first front sun gear is engaged with the first front planetary gearset, the first rear sun gear is engaged with the first rear planetary gearset which is engaged with the first gear ring, and the first planetary gearset is mounted on a shaft of the first planetary carrier by a bearing.

3. The automatic transmission having three planetary rows according to claim 1, wherein in the second planetary row, the second sun gear is engaged with the second planetary gearset which is engaged with the second gear ring, and the second planetary gearset is mounted on a shaft of the second planetary carrier by a first bearing; in the third planetary row, the third sun gear is engaged with the third planetary gearset which is engaged with the third gear ring, and the third planetary gearset is mounted on a shaft of the third planetary carrier by a second bearing.

4. The automatic transmission having three planetary rows according to claim 1, wherein one end of the first brake is connected to a box body of the transmission, another end of the first brake is connected to the first rear sun gear; one end of the second brake is connected to the box body of the transmission, another end of the second brake is connected to the first front sun gear; and one end of the third brake is connected to the box body of the transmission, another end of the third brake is connected to the first planetary carrier and the second gear ring.

5. The automatic transmission having three planetary rows according to claim 1, wherein the third sun gear is fixedly connected to the box body of the transmission.

6. The automatic transmission having three planetary rows according to claim 1, wherein the first, the second and the third clutches are multi-plate wet clutches or canine clutches.

7. The automatic transmission having three planetary rows according to claim 1, wherein the input element and the second sun gear are connected by welding or by splines, or in an integrated structure; the output element and the third planetary carrier are connected by welding or by splines, or in an integrated structure; the second planetary carrier and the third gear ring are connected by welding or by splines, or in an integrated structure; the first gear ring and the third planetary carrier are connected by welding or by splines, or in an integrated structure.

8. The automatic transmission having three planetary rows according to claim 1, wherein a first forward speed ratio is established between the input element and the output element, once the third clutch and the third brake are engaged simultaneously;

a second forward speed ratio is established between the input element and the output element, once the third clutch and the second brake are engaged simultaneously;

a third forward speed ratio is established between the input element and the output element, once the third clutch and the first brake are engaged simultaneously;

a fourth forward speed ratio is established between the input element and the output element, once the first clutch and the third clutch are engaged simultaneously;

a fifth forward speed ratio is established between the input element and the output element, once the second clutch and the third clutch are engaged simultaneously;

a sixth forward speed ratio is established between the input element and the output element, once the first clutch and the second clutch are engaged simultaneously;

a seventh forward speed ratio is established between the input element and the output element, once the second clutch and the first brake are engaged simultaneously;

an eighth forward speed ratio is established between the input element and the output element, once the second clutch and the second brake are engaged simultaneously; and a reverse speed ratio is established between the input element and the output element, when the first clutch and the third brake are engaged simultaneously.

9. A vehicle, comprising the automatic transmission having three planetary rows according to claim 1.

* * * * *